US012637126B2

(12) United States Patent
Foley et al.

(10) Patent No.: US 12,637,126 B2
(45) Date of Patent: May 26, 2026

(54) DUMP CART BOLT SYSTEM

(71) Applicant: Tricam Industries, Inc., Eden Prairie, MN (US)

(72) Inventors: Joseph P. Foley, Mendota Heights, MN (US); Benjamin P. Williams, Chaska, MN (US); Benjamin M. Wernberg, Savage, MN (US); Dennis D. Simpson, Plymouth, MN (US)

( * ) Notice: Subject to any disclaimer, the term of this patent is extended or adjusted under 35 U.S.C. 154(b) by 0 days.

(21) Appl. No.: 18/406,934

(22) Filed: Jan. 8, 2024

(65) Prior Publication Data

US 2024/0182095 A1 Jun. 6, 2024

Related U.S. Application Data

(63) Continuation of application No. 17/691,249, filed on Mar. 10, 2022.

(51) Int. Cl.
B62B 3/08 (2006.01)
B62B 3/00 (2006.01)

(52) U.S. Cl.
CPC ................ B62B 3/08 (2013.01); B62B 3/003 (2013.01)

(58) Field of Classification Search
CPC ...... B60P 1/08; B60P 1/18; B60P 1/24; B60P 1/28; B60P 1/283; B60P 1/286; B62B 3/08; B62B 3/003; B62B 2203/07; B62B 3/007
USPC ................ 298/1 C, 2, 3, 5, 10, 17 SG, 17 T; 403/181
See application file for complete search history.

(56) References Cited

U.S. PATENT DOCUMENTS

| | | | | |
|---|---|---|---|---|
| 4,861,110 A | * | 8/1989 | Rumpke | .................. B62B 3/08 |
| | | | | 298/2 |
| 6,193,319 B1 | * | 2/2001 | Kielinski | ................. B62B 1/16 |
| | | | | 298/2 |
| 11,299,187 B2 | * | 4/2022 | Foley | ........................ B62B 3/08 |
| 2003/0193233 A1 | * | 10/2003 | Brant | ........................ B62B 1/24 |
| | | | | 298/2 |

* cited by examiner

*Primary Examiner* — Stephen T Gordon

(57) ABSTRACT

A dumping cart is disclosed. The cart allows for complete dumping while maintaining four wheels on the ground and can rotate the rear set of wheels to allow the bed of the cart to be completely turned over for emptying. Also disclosed is a method of attaching an article retaining bed to a cart.

20 Claims, 21 Drawing Sheets

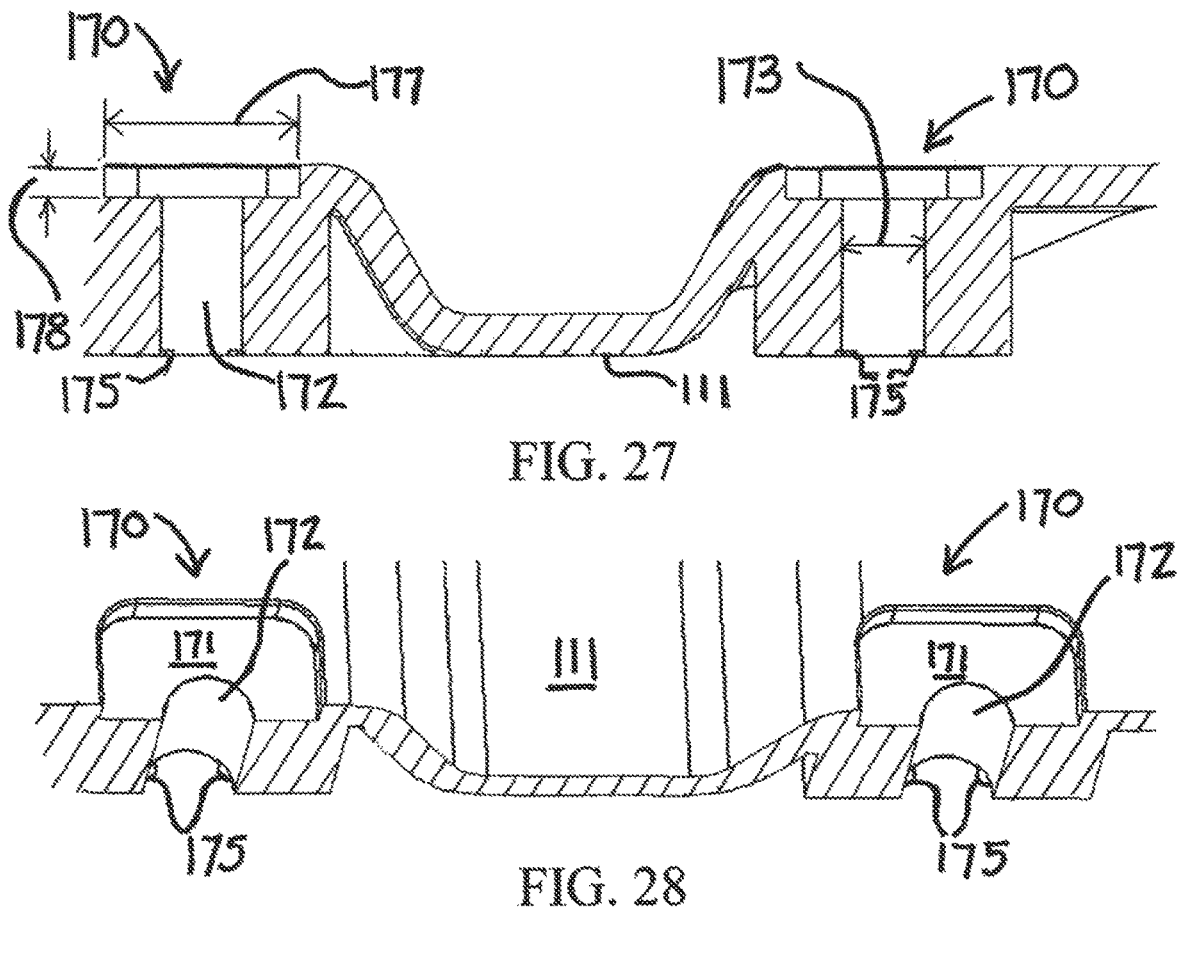
FIG. 27
FIG. 28
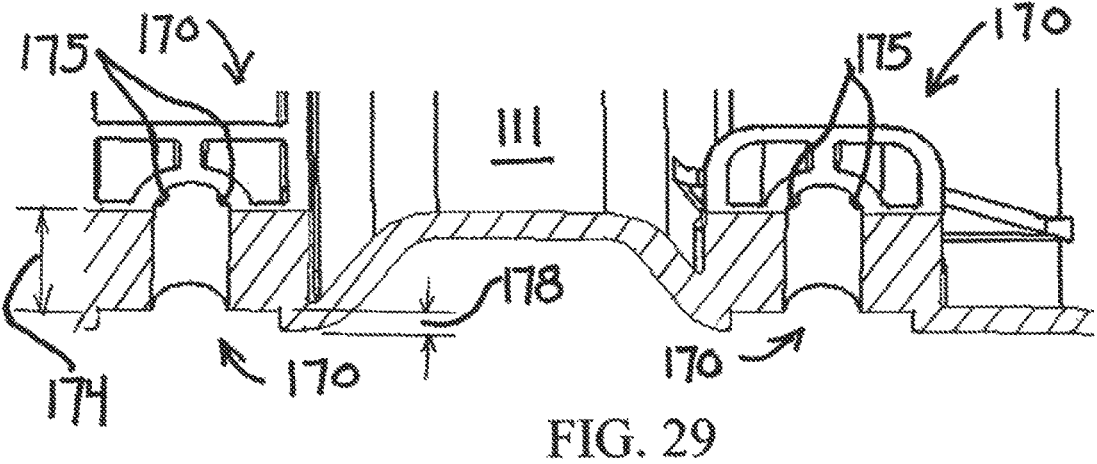
FIG. 29

DUMP CART BOLT SYSTEM

RELATED APPLICATION

This application is a continuation of application Ser. No. 16/266,750, filed Feb. 4, 2019, entitled "Dump Cart", which is fully incorporated herein by reference.

TECHNICAL FIELD

The invention relates generally to carts used for transporting and dumping articles. More particularly, the present invention relates to an improved dumping utility cart designed for cost effectively transporting and dumping articles. And, specifically, the present invention relates to means of attaching a cart bed to a frame.

BACKGROUND

It is often desirable to transport cumbersome articles, through the use of a cart or wagon, from point A to point B that could not otherwise be easily transported by one or more individuals. Furthermore, it is desirable to transport and easily dump various types of particulate matter, such as dirt, loose gravel, and livestock feed as well as a multitude of other articles. Such a cart may function as a trailer towed behind a motorized vehicle, towed by a person, or self-propelled.

There are many forms of carts that have been used for carrying and dumping a variety of items. Many of which contain a relatively flat bed used to contain the articles in transit and a pivoting mechanism for slidably removing the articles from the bed to an alternate location.

Various mechanisms have been employed to transfer cumbersome cargo from the transport cart to another location. Manual unloading has been used. However, multitudes of pivoting mechanisms have been exploited to achieve the desired dumping. Placement of the pivot and the size of the dumping cart vary considerably throughout the prior art. Larger carts employ pneumatic cylinders and hydraulics to pivot the bed and allow for dumping of the articles transported.

Dumping carts and hinging trailers are known, including those disclosed in U.S. Pat. No. 3,833,263 to Jackson; U.S. Pat. No. 4,711,499 to Fortin; U.S. Pat. No. 4,889,390 to Campbell; U.S. Pat. No. 5,395,163 to Mandell et al.; U.S. Pat. No. 5,544,944 to Keech; and U.S. Pat. No. 6,290,301 to Bockman, all of which are incorporated herein by reference. Improvements over these earlier patents include U.S. Pat. No. 6,662,679 to Hobdy et al.; U.S. Pat. No. 6,851,756 to Pieschel; U.S. Pat. No. 6,962,370 to Simpson; U.S. Pat. No. 7,175,205 to Simpson; U.S. Pat. No. 7,210,697 to Simpson; U.S. Pat. No. 7,390,065 to Pieschel et al.; U.S. Pat. No. 7,441,792 to Simpson; U.S. Pat. No. 7,818,865 to Pieschel et al.; U.S. Pat. No. 7,887,141 to Pieschel et al.; U.S. Pat. No. D819,917 to Simpson et al.; U.S. Pat. No. D826,507 to Wernberg et al., all of which are incorporated herein by reference.

The desirable elements of the present invention are neither taught nor disclosed in the prior art. The present invention is therefore a useful improvement upon the prior art of record.

SUMMARY OF THE DISCLOSURE

The disclosed invention improves the functionality of dumping carts by allowing a cart to be oriented in multiple dumping positions that help remove articles or materials being transported by the cart. The dumping cart includes a chassis and an article retaining bed that has articulation axis intermediate a front set of wheels and a rear set of wheels when in a carrying orientation.

When it is desired to empty the contents of the dumping cart, a lock is released, which allows the article retaining bed and rear wheels to pivot with respect to the chassis. The dumping cart can be rotated to a full-dump position or alternatively, be rotated to a dump or over-dump orientation in which the rear wheels rotate around the articulation axis from an approximately 90 degree relation with the chassis to approximately 180 degree rotation where the floor of the article retaining bed is parallel and facing the ground. Also disclosed is an improved means of attaching an article retaining bed to a cart.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The disclosure can be more completely understood in consideration of the following detailed description of various embodiments of the disclosure, in connection with the accompanying drawings, in which.

US 12,637,126 B2

3

Figure 19:
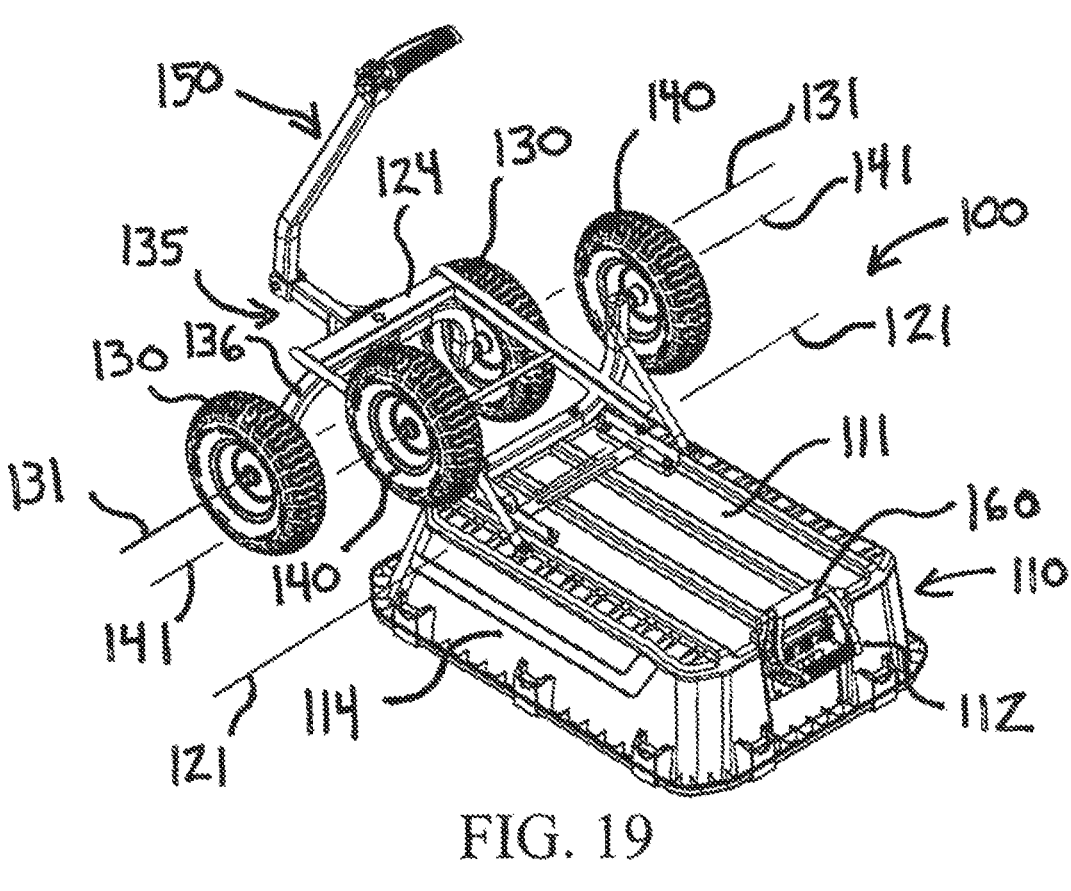
FIG. 19 is a top rear perspective view depicting a dumping cart in accordance with an embodiment of the disclosure in a full-dump orientation.
Figure 20:
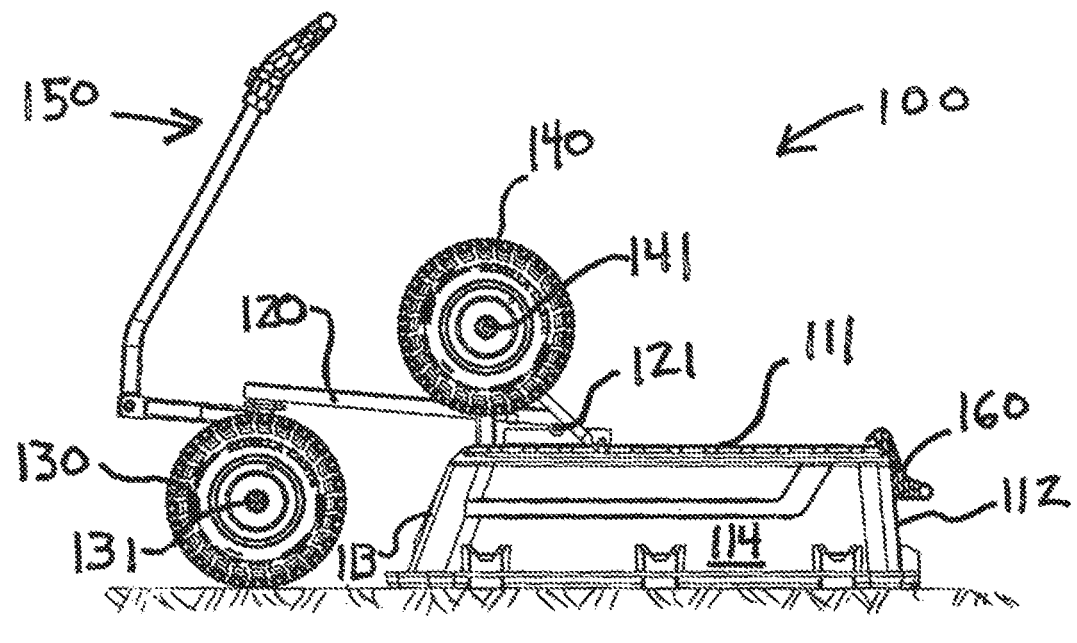
FIG. 20 is a left elevation view of the dumping cart of FIG. 19.
Figure 21:
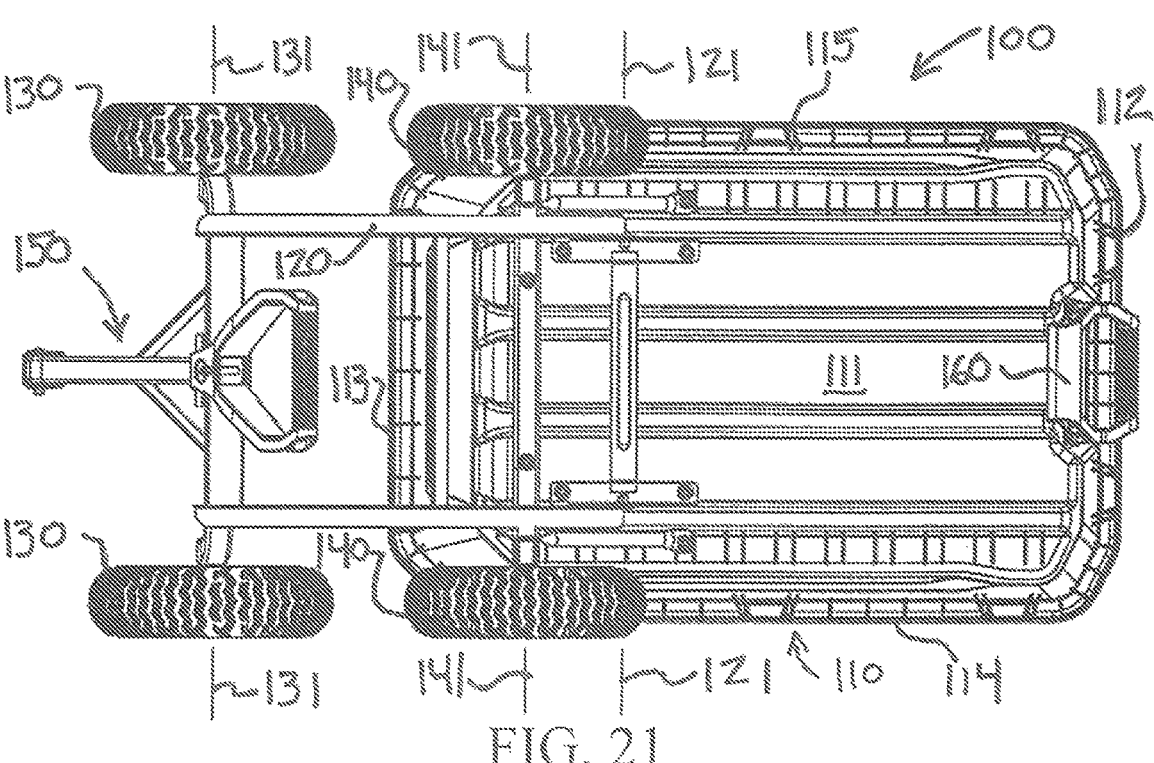
FIG. 21 is a top view of the dumping cart of FIG. 19.
Figure 22:
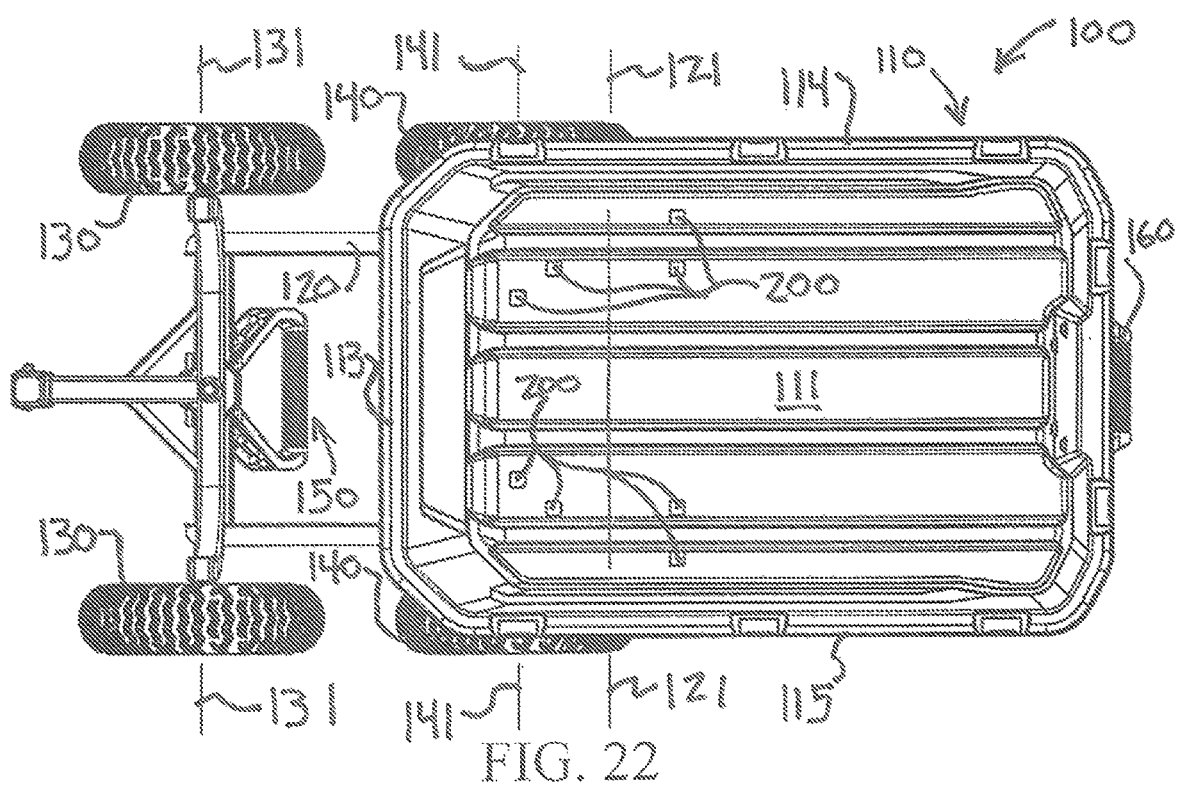

FIG. 22 is a bottom view of the dumping cart of FIG. 19.

Figure 23:
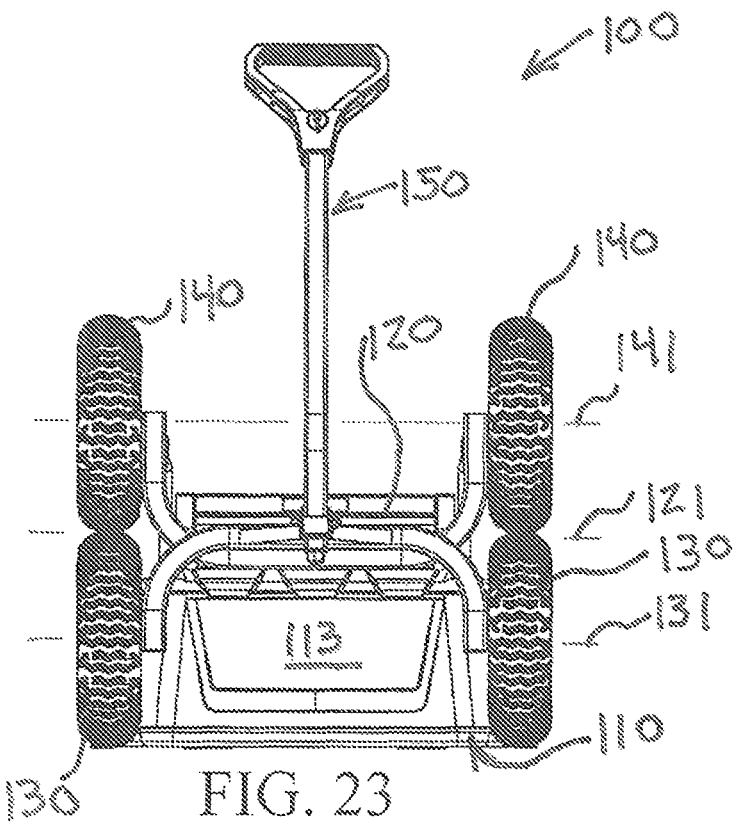

FIG. 23 is a front elevation view of the dumping cart of FIG. 19.

Figure 24:
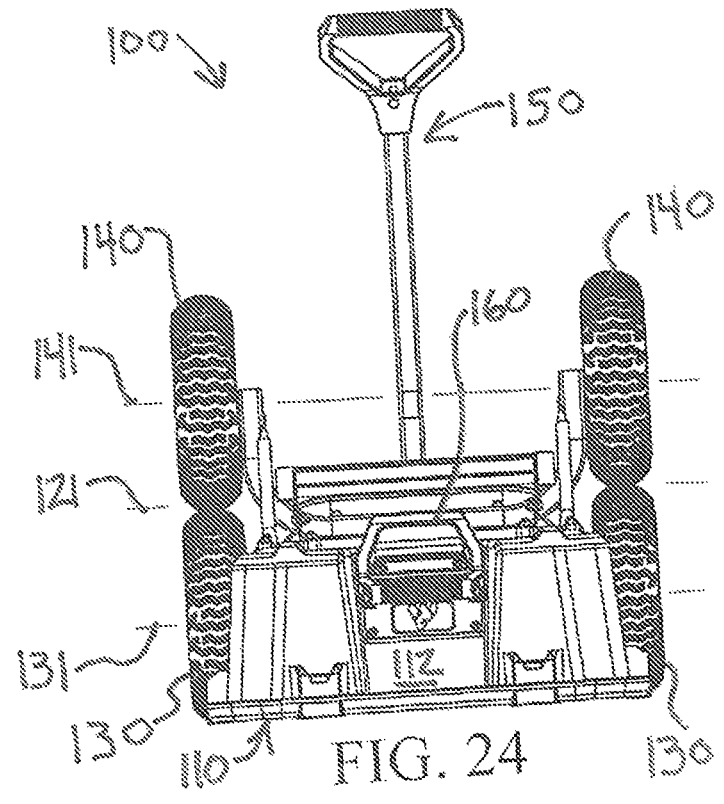

FIG. 24 is a rear elevation view of the dumping cart of FIG. 19.

Figure 1:
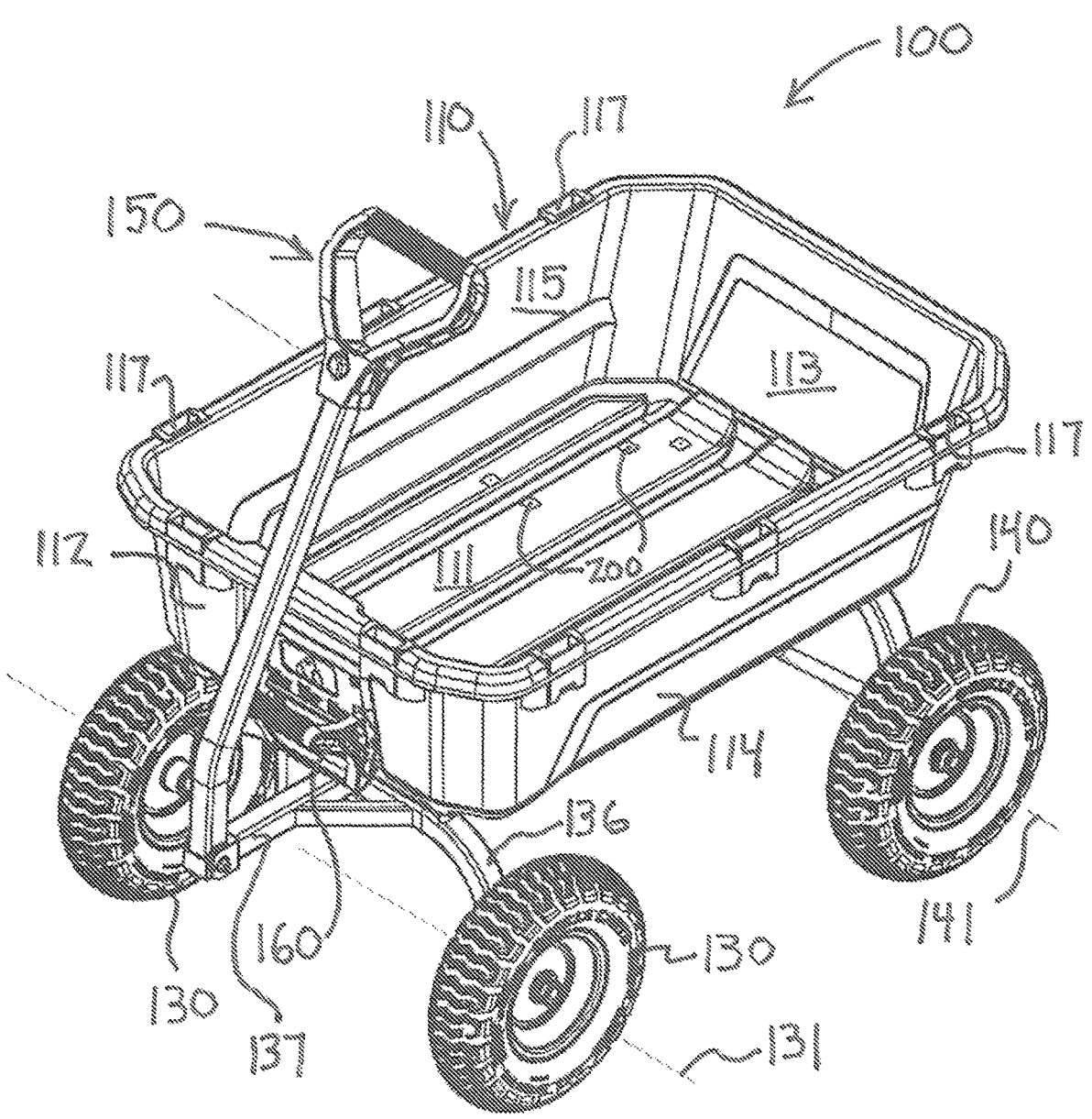
FIG. 1 is a top front perspective view depicting a dumping cart in accordance with an embodiment of the disclosure in a carrying orientation.
Figure 2:
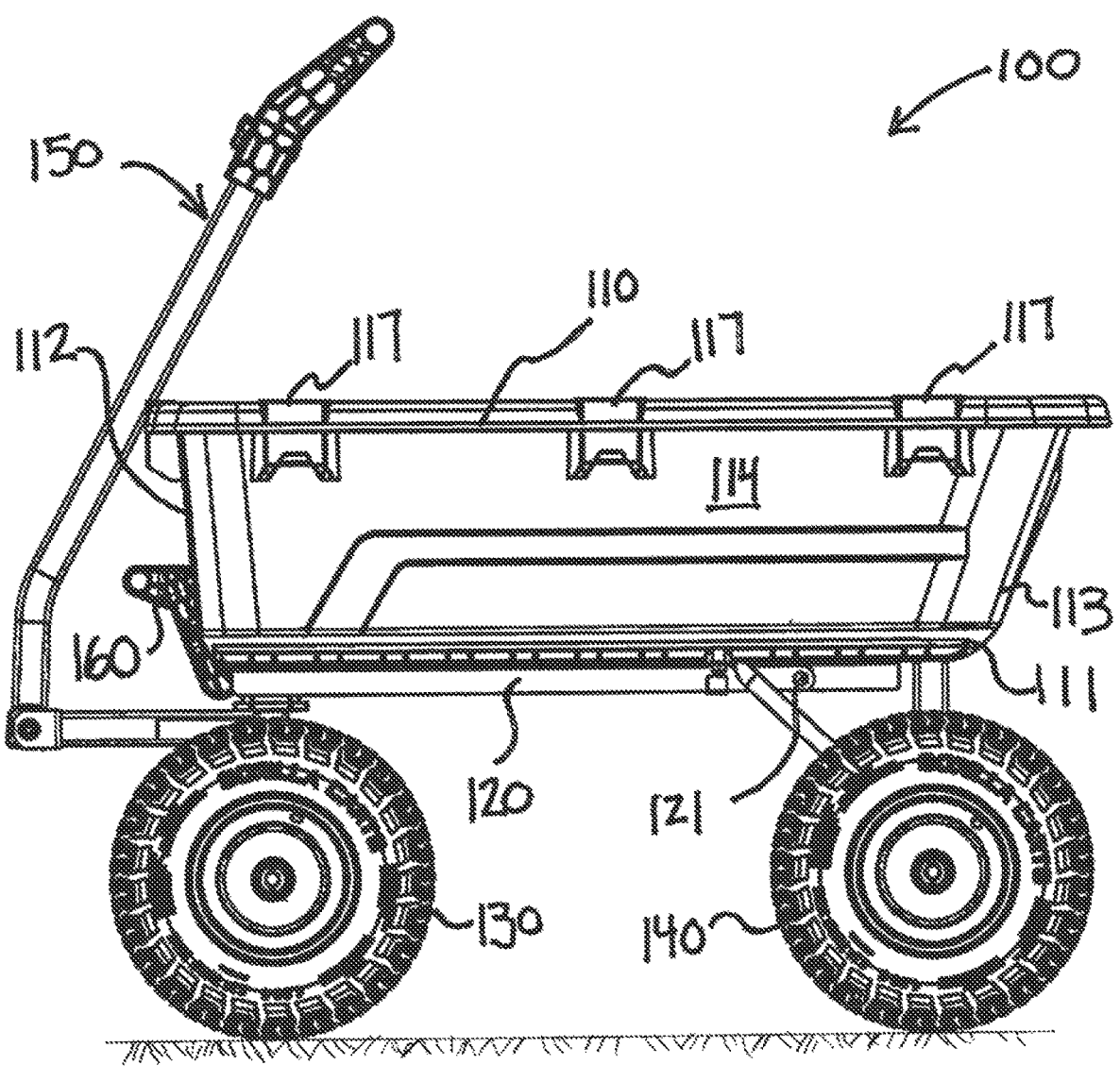
FIG. 2 is a left elevation view of the dumping cart of FIG. 1.
Figure 3:
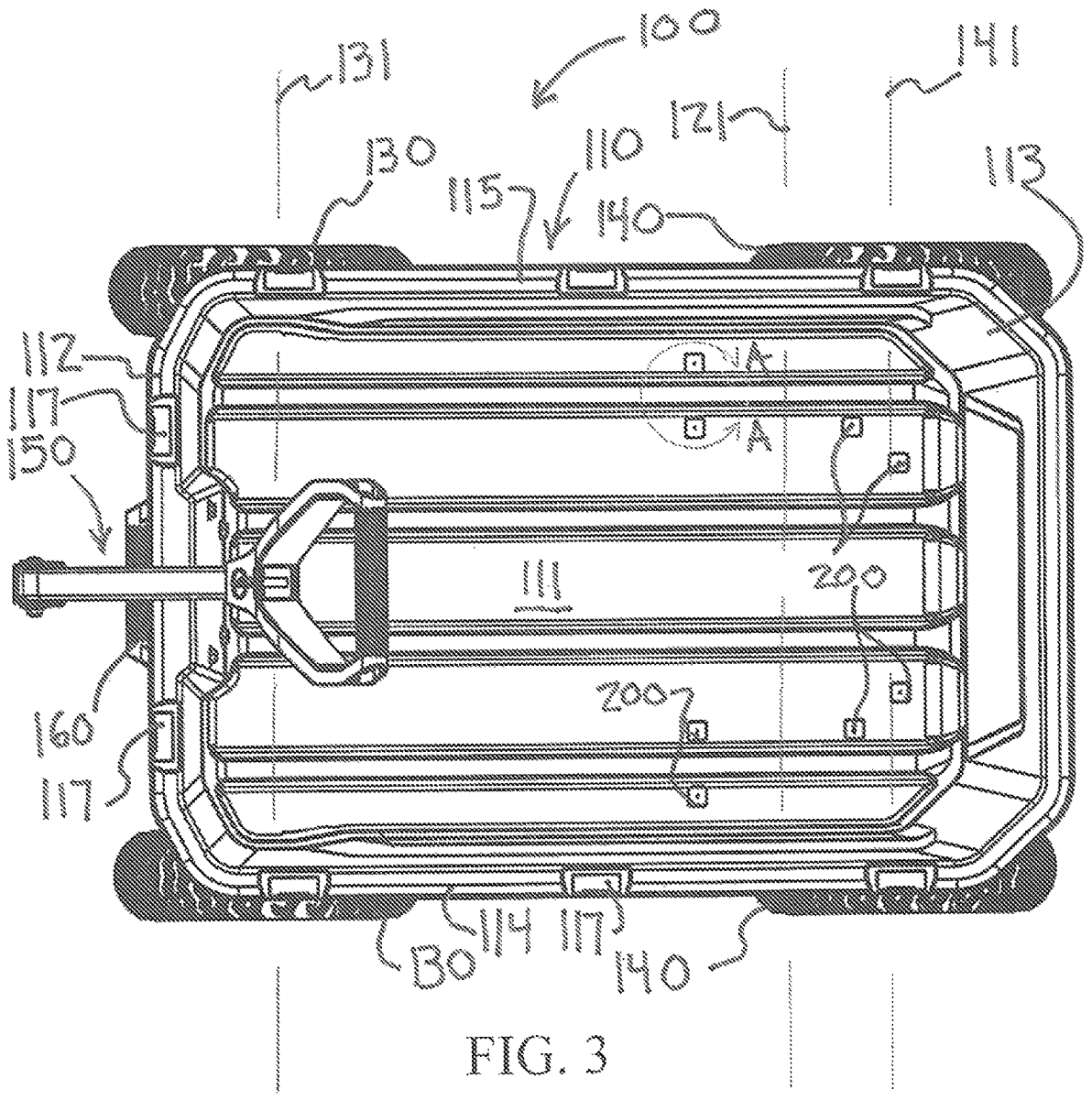
FIG. 3 is a top view of the dumping cart of FIG. 1.
Figure 25:
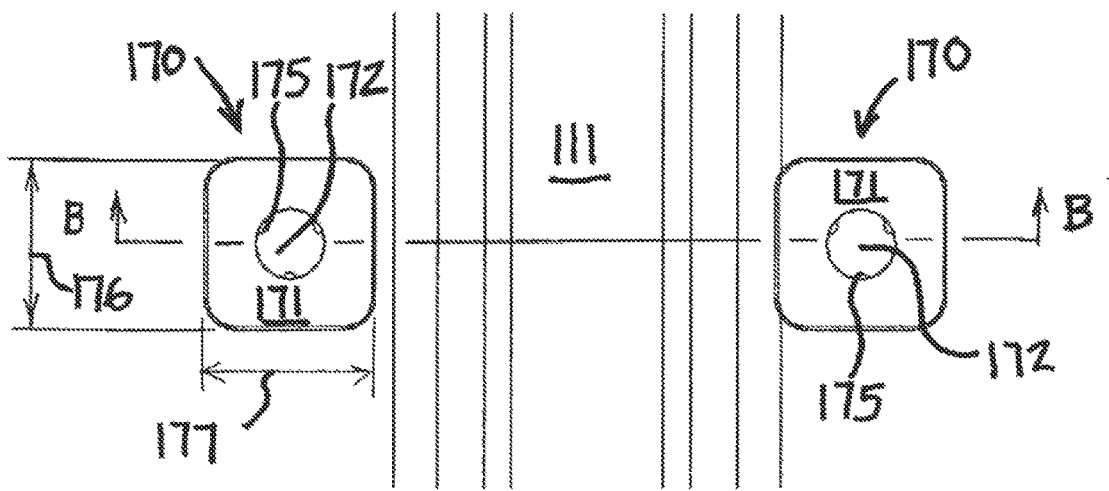

FIG. 25 is a top detail view of the article retaining bed of FIG. 3 at A-A.

Figure 4:
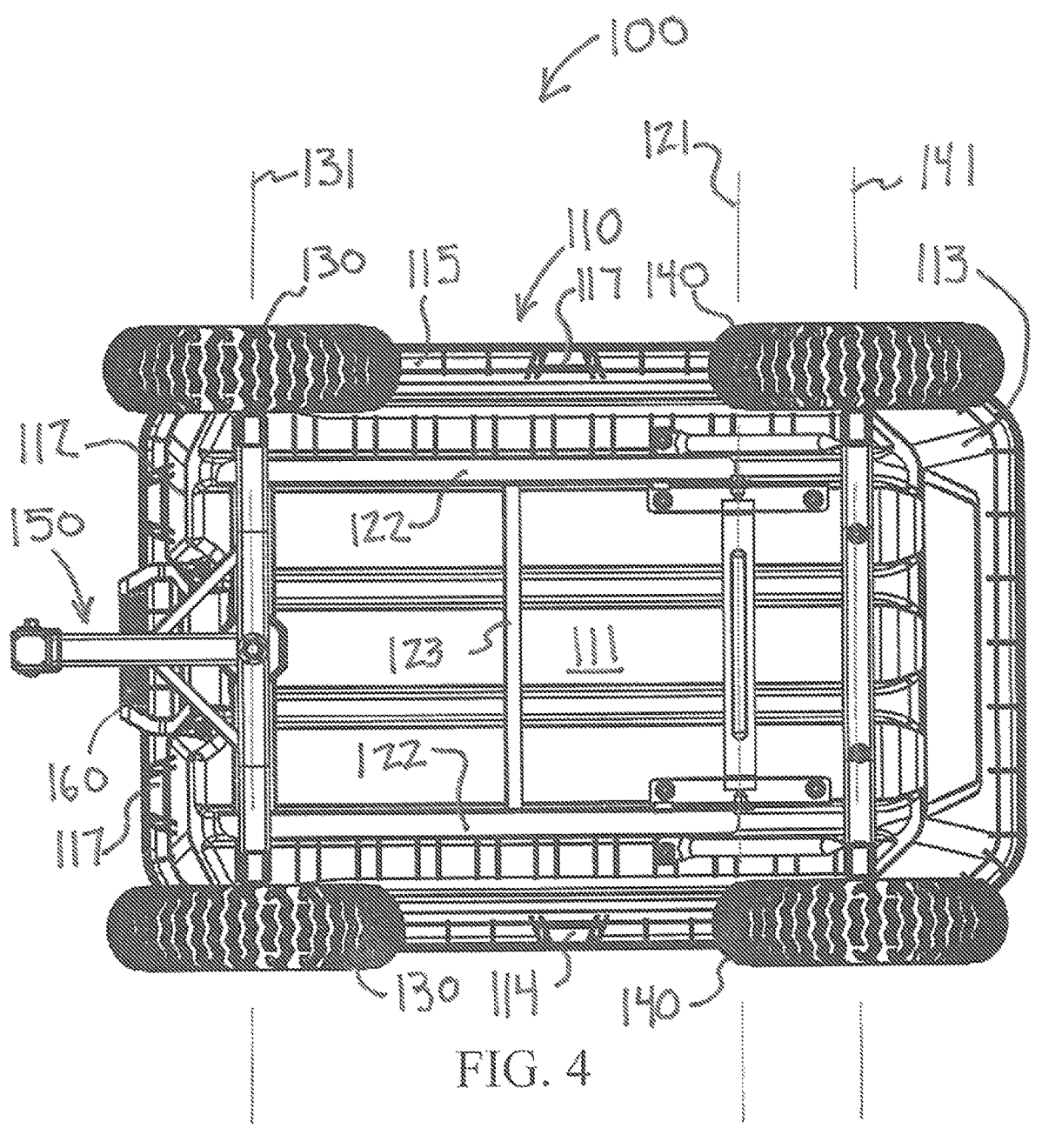
FIG. 4 is a bottom view of the dumping cart of FIG. 1.
Figure 26:
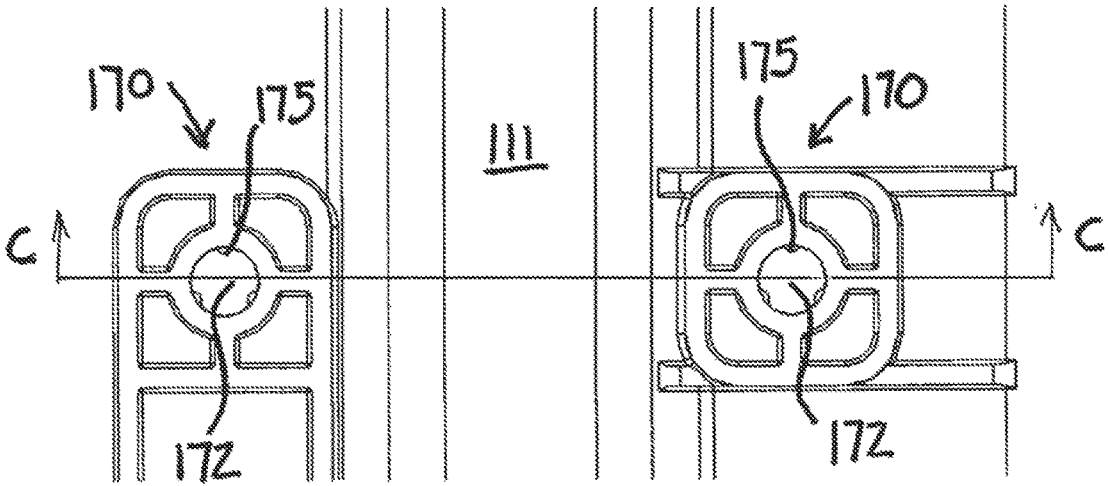

FIG. 26 is a bottom detail view of the article retaining bed of FIG. 4.

FIG. 27 is a sectional view of the detail view of the article retaining bed of FIG. 25 at B-B.

FIG. 28 is a top perspective view of the article retaining bed of FIG. 27.

FIG. 29 is a sectional view of the detail view of the article retaining bed of FIG. 26.

Figures 30, 31, 32, 33, 34:
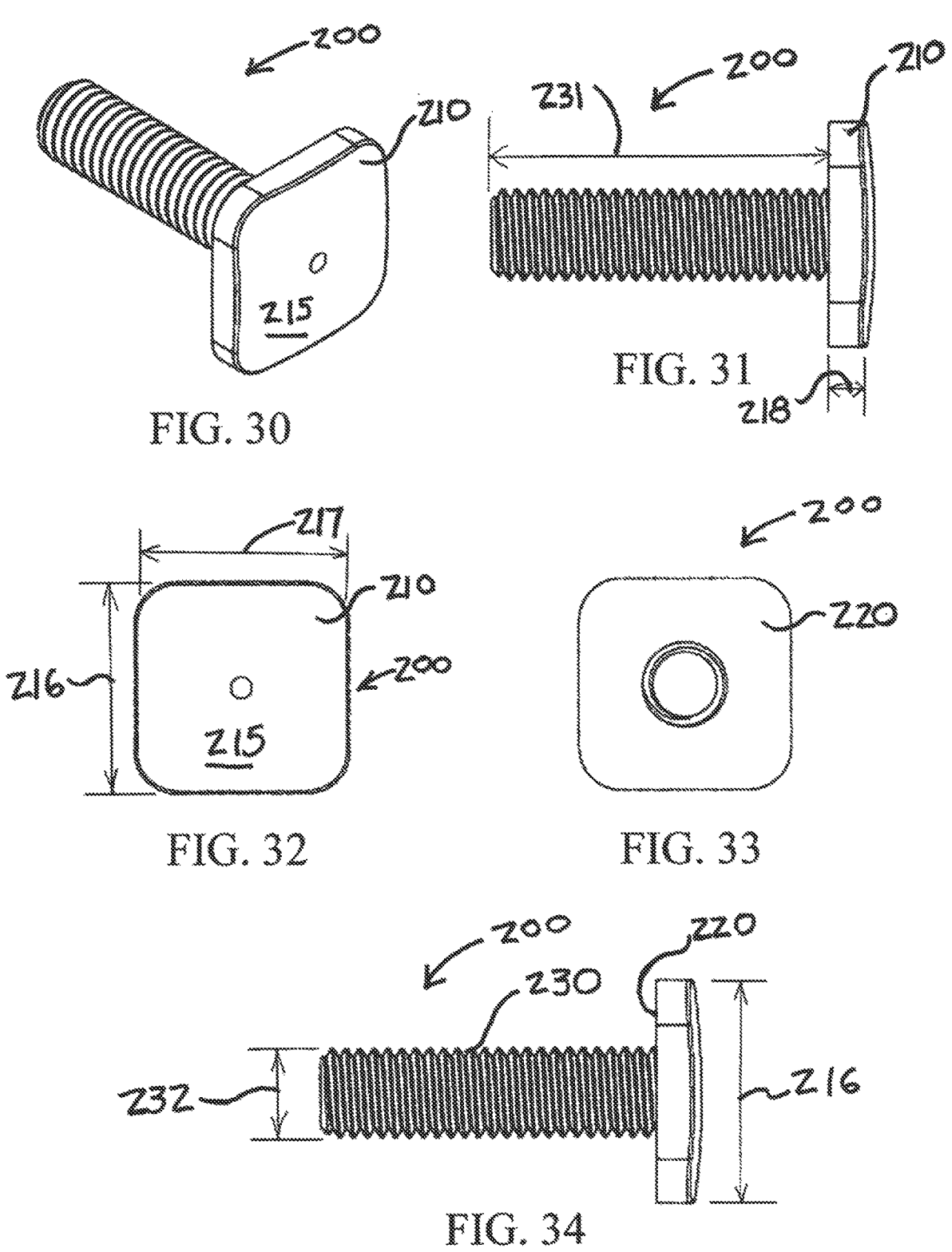

FIG. 30 is a top perspective view depicting a square-head bolt in accordance with an embodiment of the disclosure.

FIG. 31 is a top view of the square-head bolt of FIG. 30.

FIG. 32 is a front elevation view of the square-head bolt of FIG. 30.

FIG. 33 is a rear elevation view of the square-head bolt of FIG. 30.

FIG. 34 is a right elevation view of the square-head bolt of FIG. 30.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIGS. 1-6, a dumping cart of the present invention is generally designated in the drawings by reference numeral 100. The dumping utility cart 100 contains an article retaining bed 110, a chassis 120, a front set of wheels 130, a rear set of wheels 140, and a handle 150. Alternatively, the cart 100 may have a single front wheel 130.

The dumping cart 100 of the present invention enables items to be readily transported to a desired location and then removed from the dumping cart 100 by pivoting the article retaining bed 110 with respect to the chassis 120. Because the chassis 120 pivots at a point that is intermediate to the front set of wheels 130 and the rear set of wheels 140, the amount of force needed to pivot the article retaining bed 110 is greatly reduced when compared with prior art utility carts.

The article retaining bed 110 preferably has a generally rectangular configuration with a floor 111, a front wall 112, a rear wall 113, and a right and left side walls 114, 115 that extend between the front wall 112 and the rear wall 113. However, a person of ordinary skill in the art will appreciate that it is possible to use the concepts of the present invention with alternative bed configurations. The walls 112, 113, 114, 115 may have one or more apertures 117 that can function to hold slats or bars (not shown) to extend the height of the walls 112, 113, 114, 115 or, alternatively, to hold tools to be used in conjunction with the cart 110.

The article retaining bed 110 has a floor 111 that preferably has a substantially flat upper surface. Depending on the size of the article retaining bed 110, reinforcing beams may be provided around an outer edge of the article retaining bed 110 or extending across a central region of the article retaining bed 110 (see, e.g., FIG. 4).

The article retaining bed 110 may be made of a variety of materials including but not limited to steel, aluminum, and molded composite plastic. A smooth friction-reducing surface has been found to be particularly well suited for the present invention. The friction-reducing surface allows for greater ease of dumping cumbersome articles contained within the dumping cart 100.

Figure 13:
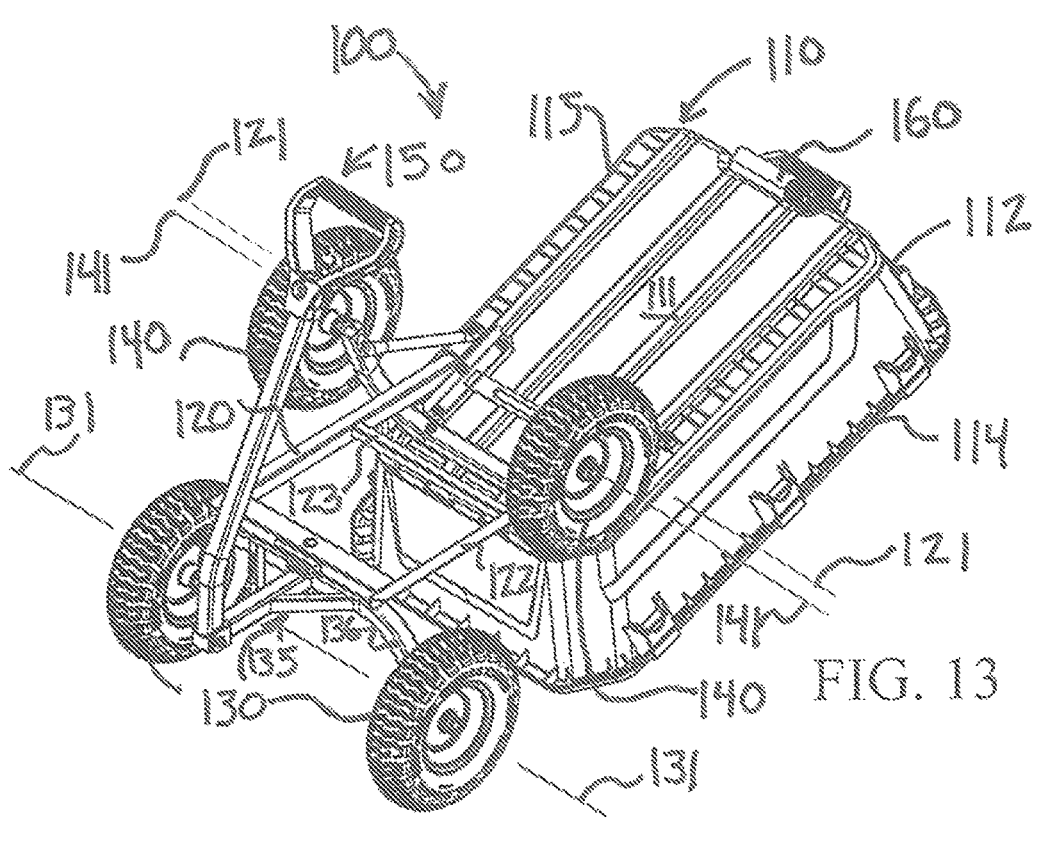
FIG. 13 is a top front perspective view depicting a dumping cart in accordance with an embodiment of the disclosure in an over-dump orientation.
Figure 14:
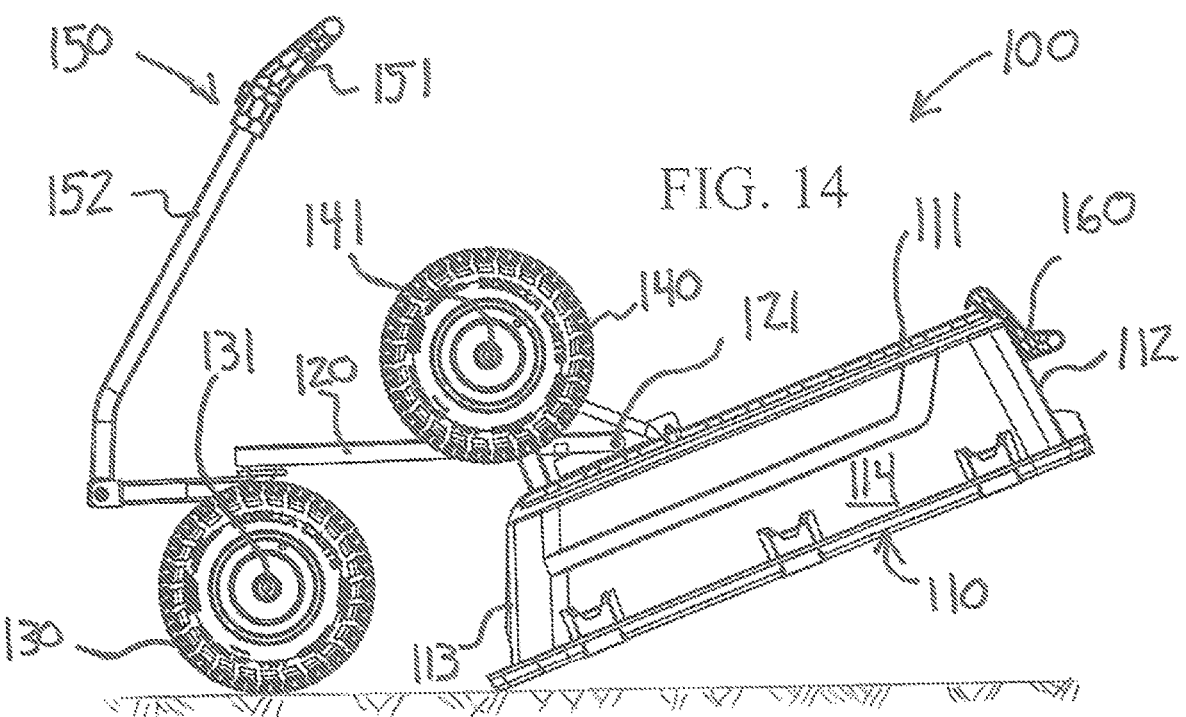
FIG. 14 is a left elevation view of the dumping cart of FIG. 13.
Figure 15:
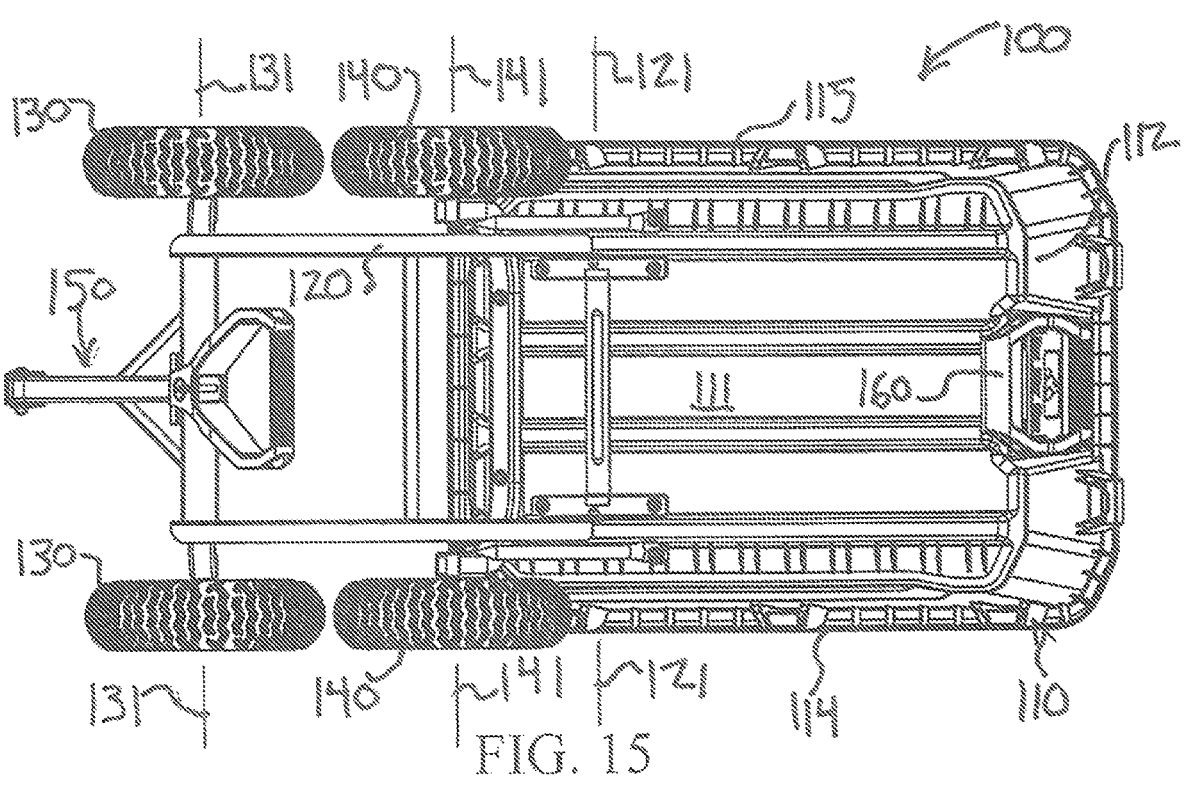
FIG. 15 is a top view of the dumping cart of FIG. 13.
Figure 16:
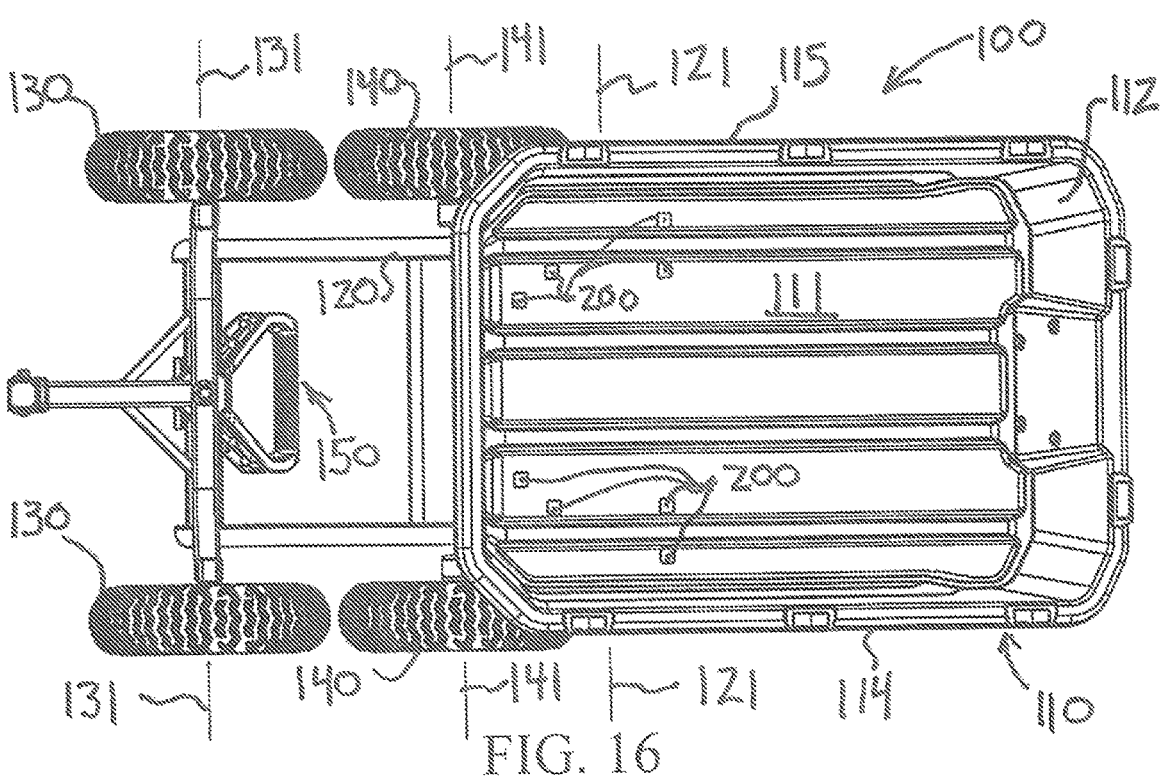
FIG. 16 is a bottom view of the dumping cart of FIG. 13.
Figure 17:
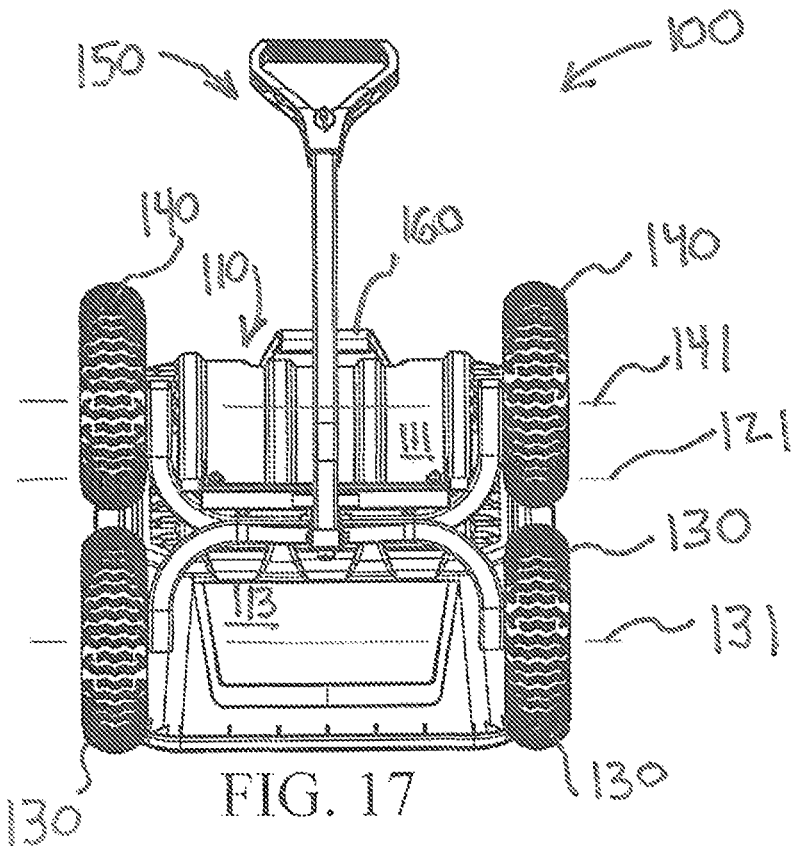
FIG. 17 is a front elevation view of the dumping cart of FIG. 13.
Figure 18:
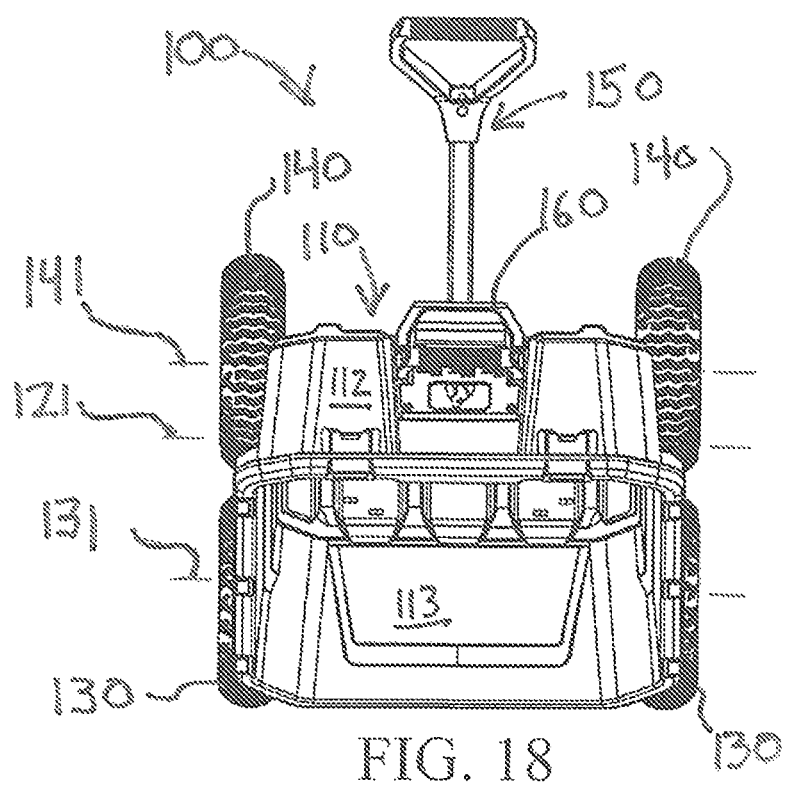
FIG. 18 is a rear elevation view of the dumping cart of FIG. 13.

The chassis 120 preferably includes a pair of side rails 122 and a plurality of braces 123 that extend between the side rails 122, as most clearly illustrated in FIGS. 4 and 13. The configuration of the side rails 122 and the braces 123 is selected based upon the anticipated load that is to be carried by the dumping cart 100. The article retaining bed 110 is connected to the chassis 120 at an articulation axis 121. The articulation axis 121 is preferably located at an end of each side rail 122. The front wheels 130 rotate around a front wheel rotation axis 131 and the rear wheels 140 rotate around a rear wheel rotation axis 141. While in the carry orientation (FIGS. 1-6), the articulation axis 121 is intermediate the front wheel rotation axis 131 and the rear wheel rotation axis 141.

The chassis 120 is pivotally connected to the article retaining bed 110 for greater ease of dumping cumbersome articles. Proper positioning of the pivot in relation to the sets of wheels 130, 140 and the article retaining bed 110 will better enable a person to use the dumping cart 100. When properly positioned in a dump orientation, the rear wheels 140 rotate under the article retaining bed 110 along an articulation axis 121 in the manner similar to that of a fulcrum that allows the article retaining bed 110 to be in a dump orientation as illustrated in FIGS. 7-12. While in this dump orientation both sets of wheels 130, 140 remain in contact with the ground while allowing the floor 110 of the article retaining bed 110 to rotate to a position that is substantially vertical. When in the dump orientation, the rear wheel rotation axis is intermediate the front wheel rotation axis 131 and the articulation axis 121.

Figure 7:
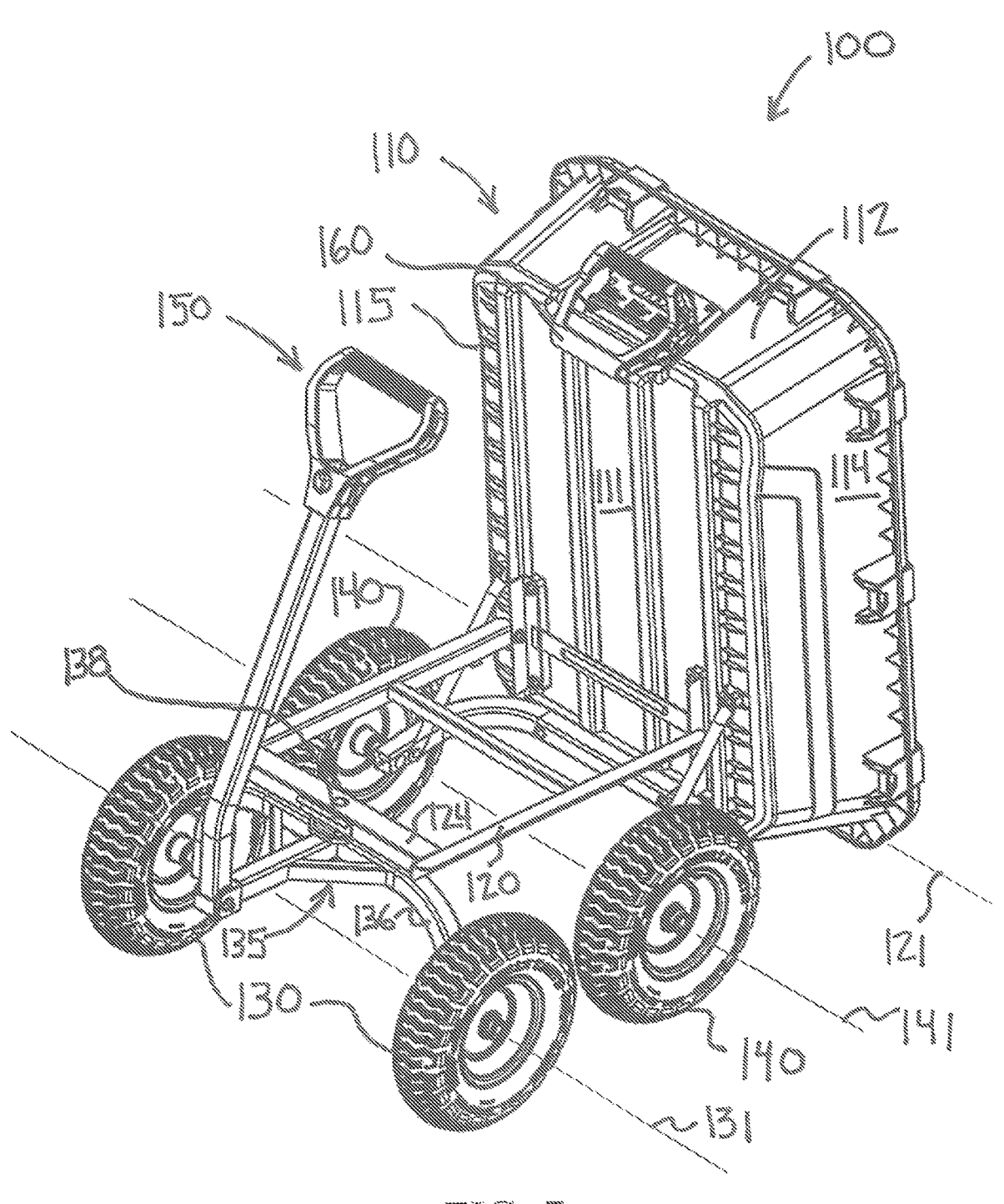
FIG. 7 is a top front perspective view depicting a dumping cart in accordance with an embodiment of the disclosure in a dump orientation.
Figure 8:
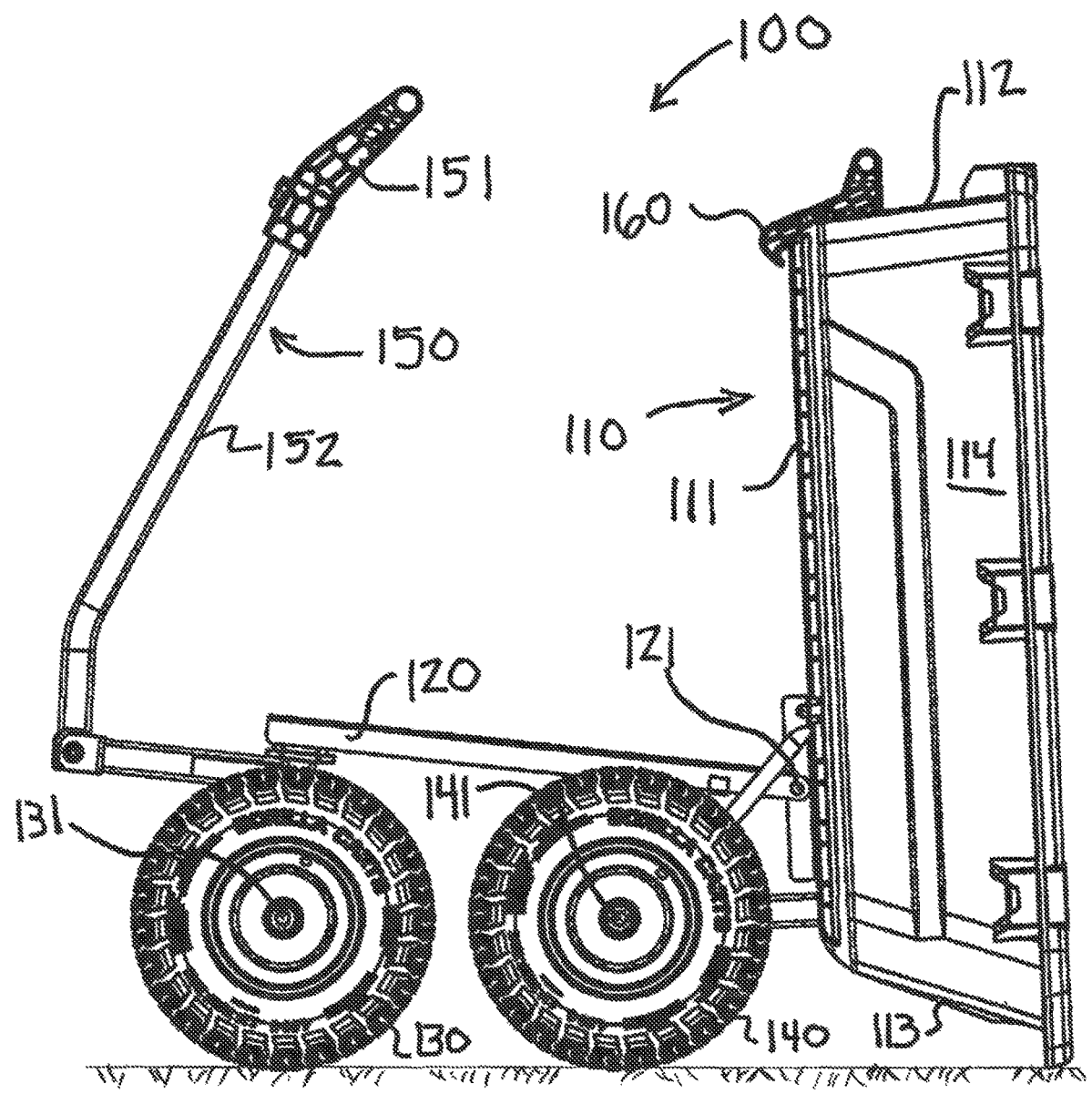
FIG. 8 is a left elevation view of the dumping cart of FIG. 7.
Figure 9:
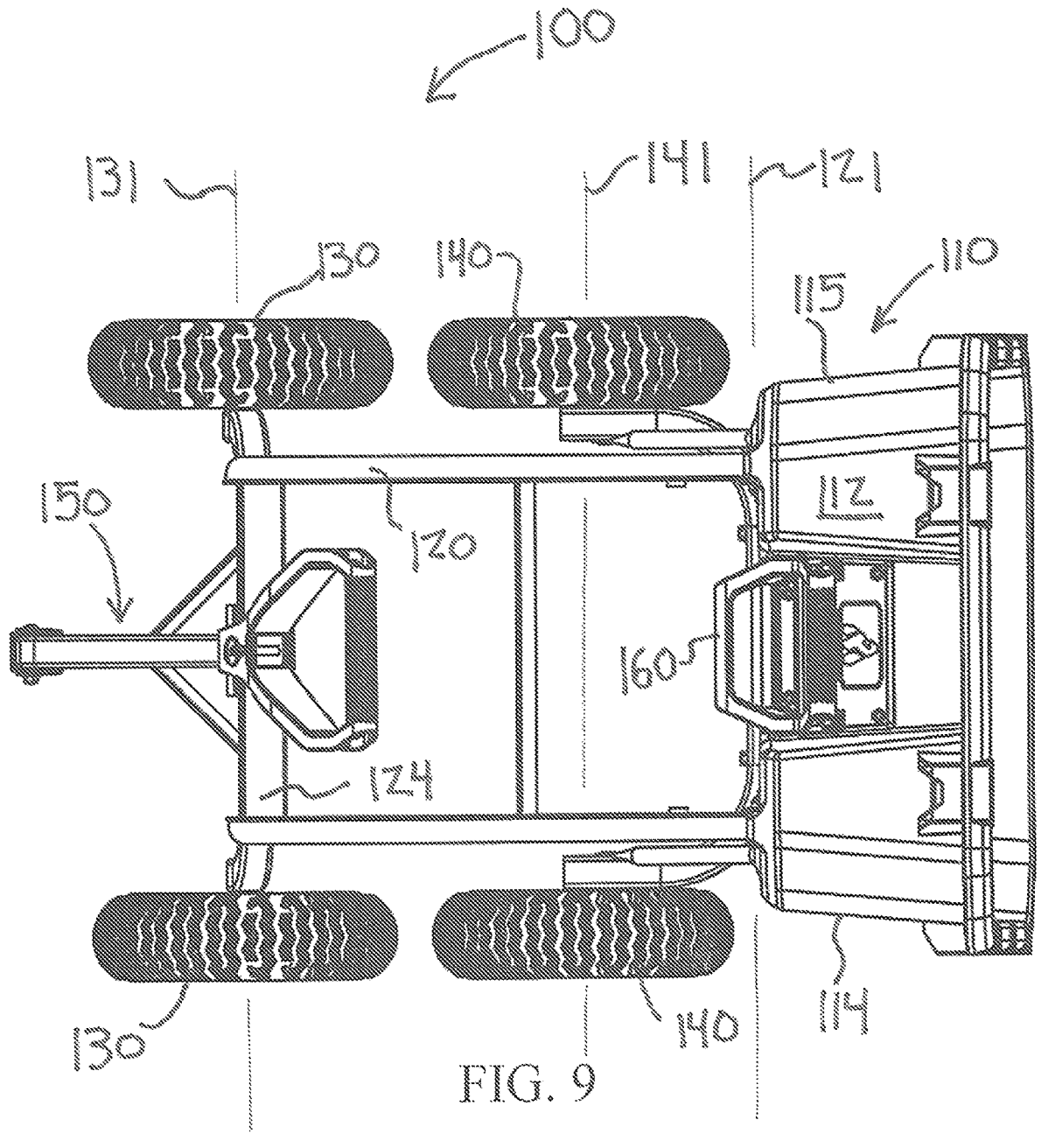
FIG. 9 is a top view of the dumping cart of FIG. 7.
Figure 10:
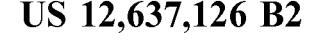
FIG. 10 is a bottom view of the dumping cart of FIG. 7.
Figure 11:
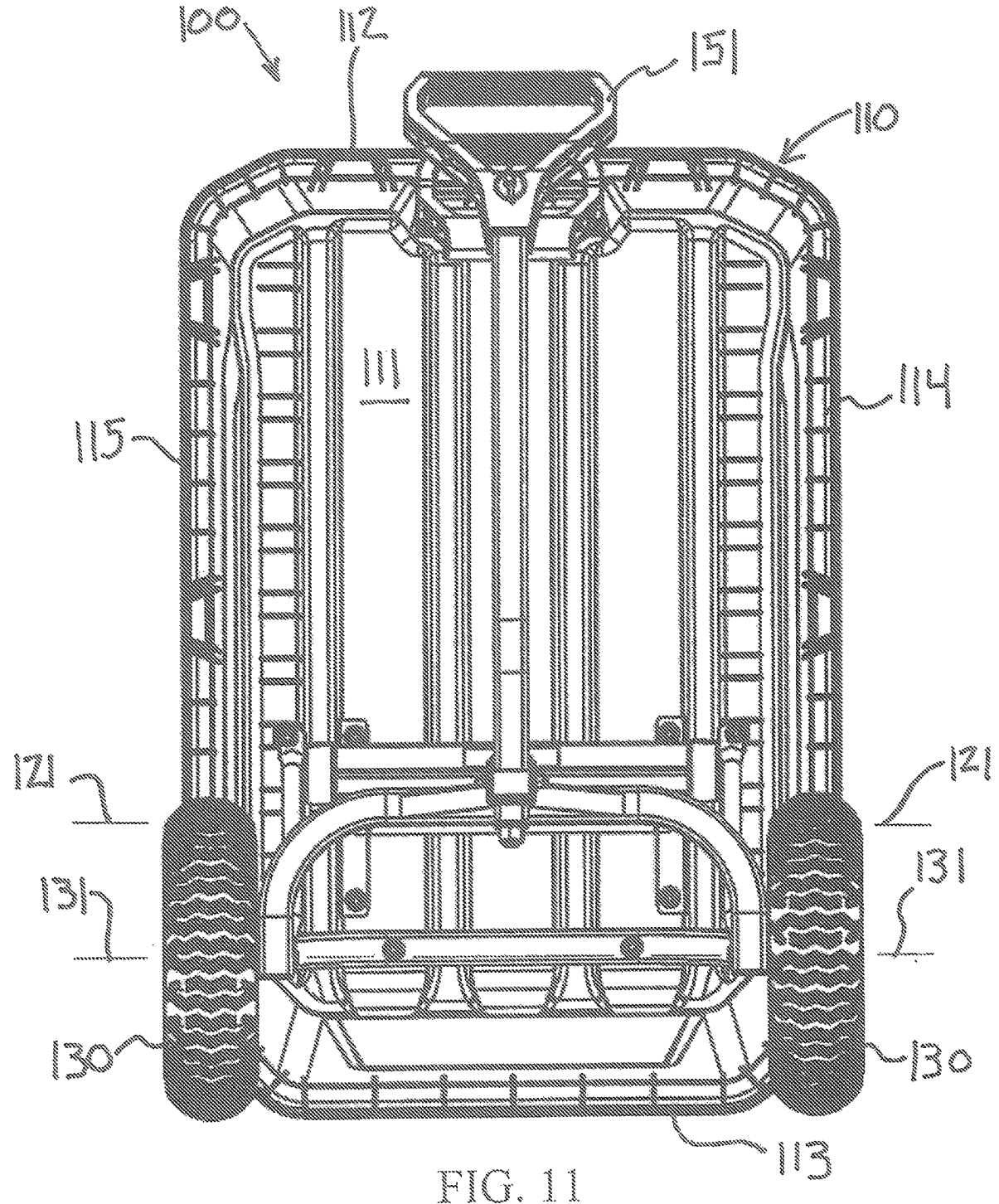
FIG. 11 is a front elevation view of the dumping cart of FIG. 7.
Figure 12:
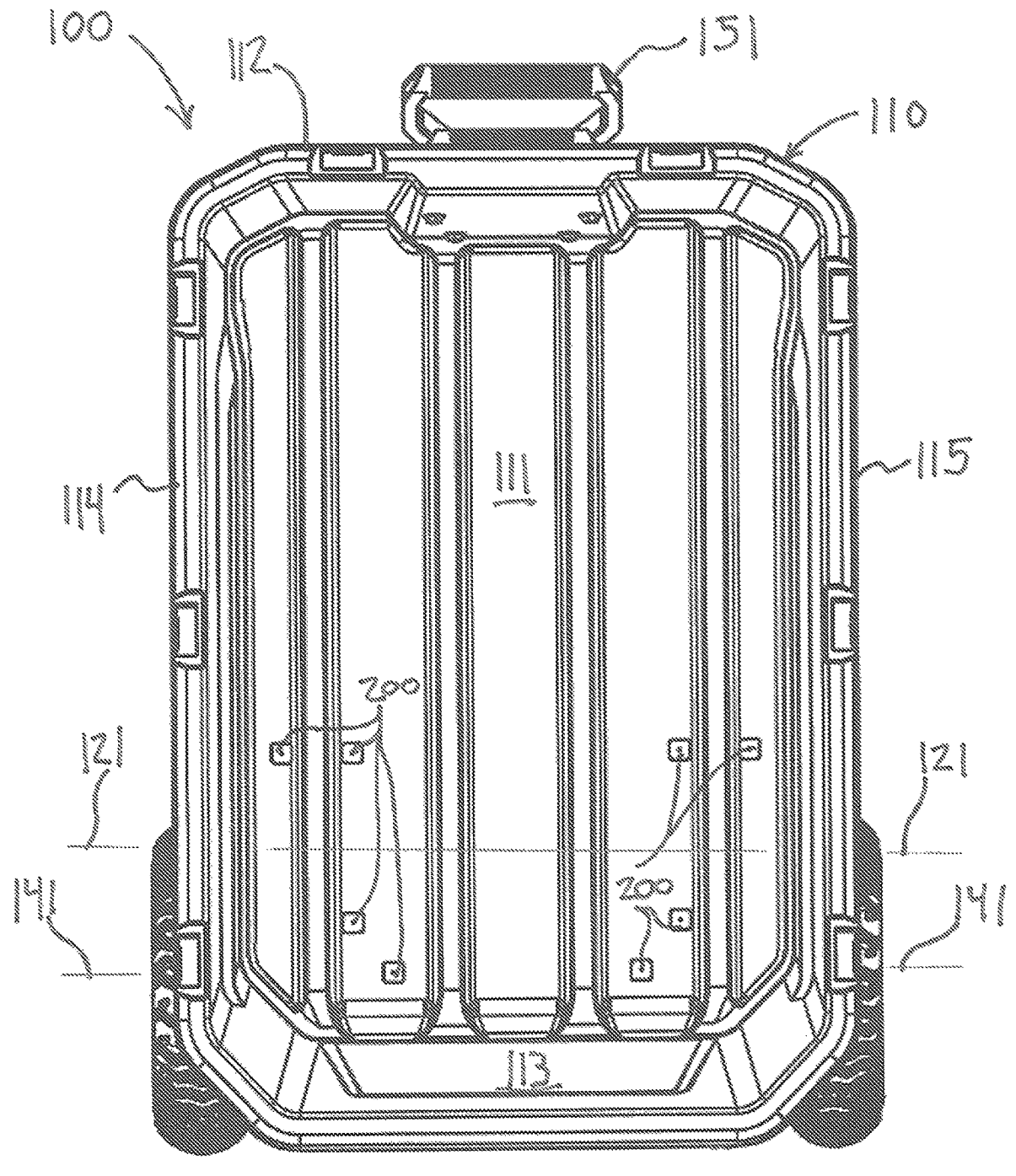
FIG. 12 is a rear elevation view of the dumping cart of FIG. 7.

By acting in this manner a relatively small amount of upward force may be employed to pivot the article retaining bed 102. As shown in FIGS. 7-8, the article retaining bed lock 160 is unlatched and employed to pivot the article retaining bed 110 and initiate the dumping process. In the process of dumping the cart 100, the wheel base decreases in length as a result of the pivot. The article retaining bed lock 160 may incorporate a handle to facilitate dumping of the cart 100 by pivoting the article retaining bed 110.

Figure 5:
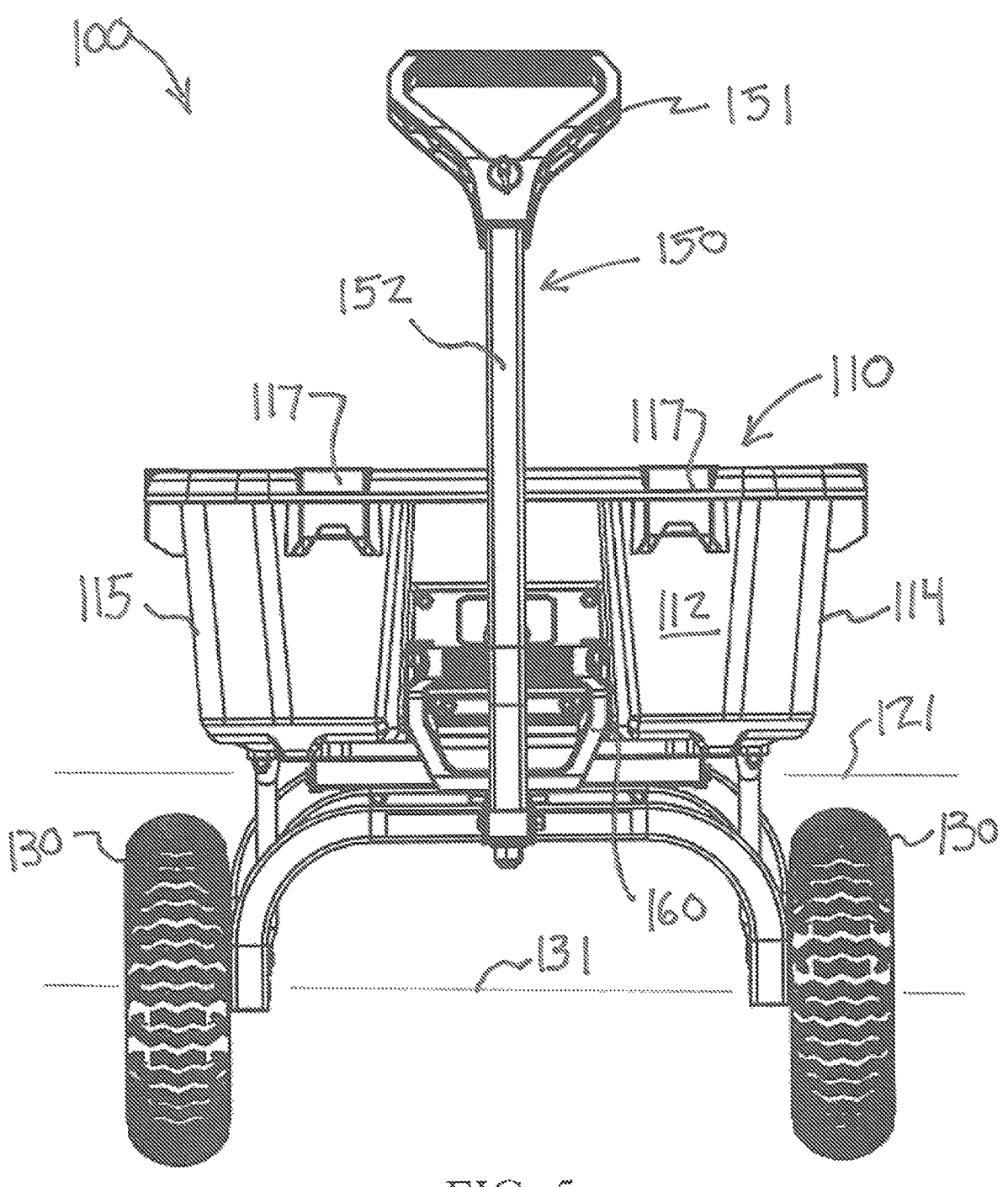
FIG. 5 is a front elevation view of the dumping cart of FIG. 1.
Figure 6:
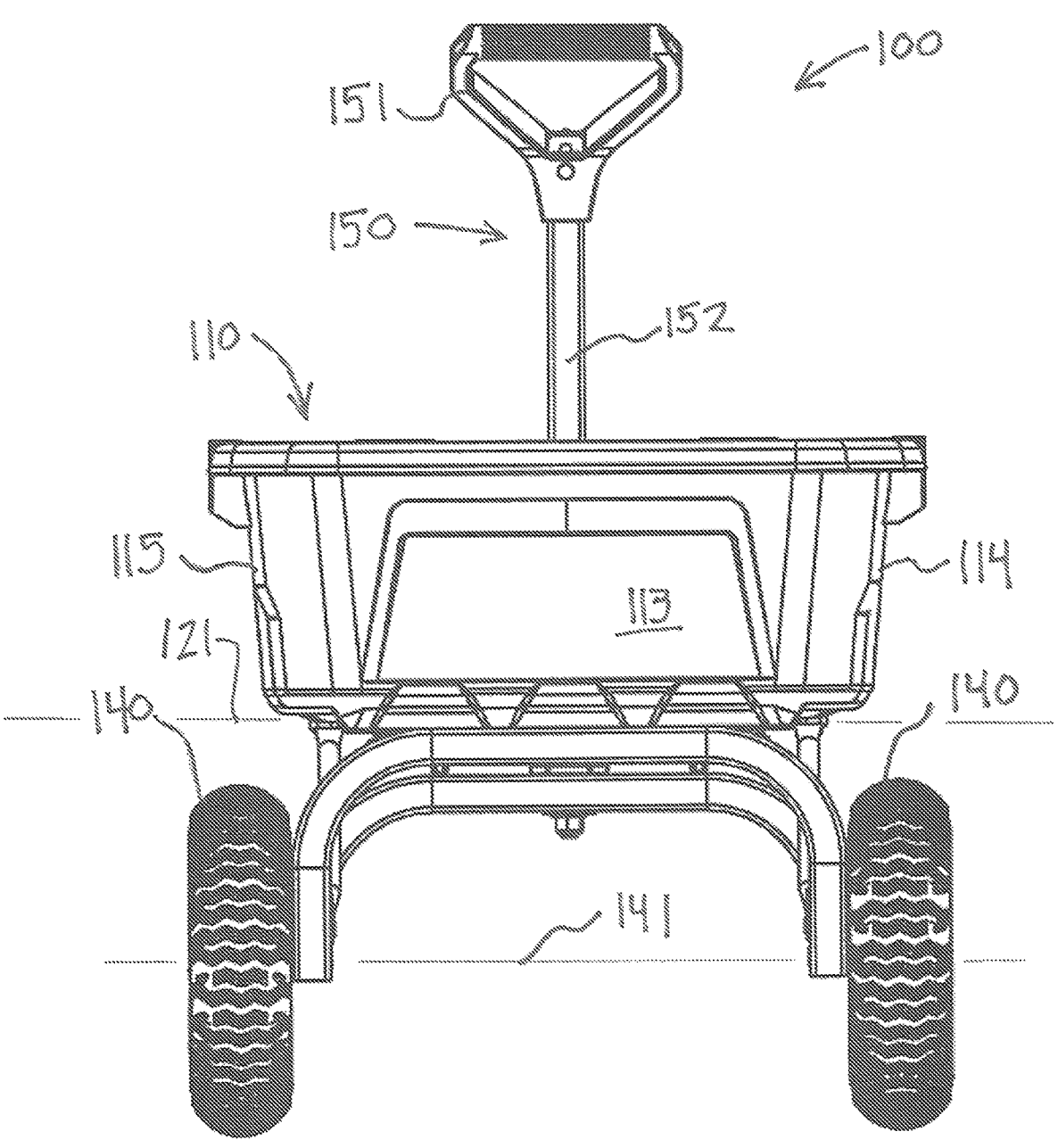
FIG. 6 is a rear elevation view of the dumping cart of FIG. 1.

The rear set of wheels 140 are rotatably attached to the floor 111 of the article retaining bed 110, as most clearly illustrated in FIG. 5. In the preferred embodiment, the rear wheels 140 rotate about a rear axle 126. Tires with inflatable inner tubes (not shown) have been found to be particularly well suited for use as the front and rear wheels 130, 140. To increase stability and durability, the rear wheels 140 are fixedly attached to the underside floor 111 of the article retaining bed 110 by at least one rear wheel brace 142.

The front set of wheels 130 are operably attached to the chassis 120, as most clearly illustrated in FIGS. 7, 13, and 19. The front set of wheels 130 are rotatably attached to a navigating mechanism 135. Pivotally attached to the navigating mechanism 135 is the handle 150. The handle comprises a grip 151 and a shaft 152.

The navigating mechanism 135 comprises a front wheel axle 136, a tow bar 137, and a steering pivot 138. The handle 150 is pivotally removably attachable to one end of the tow bar 137, which is attached to the front wheel axle 136 at its other end. The front wheel axle 136 and tow bar 137 are operably connected to the chassis 120 by a steering pivot 138. The handle 150 may be convertible to allow the dumping cart to be pulled by hand or attached to a vehicle with a clevis. In a preferred embodiment handle 150 comprises a grip 151 and a shaft 152, the grip 151 being axially slidable along the shaft 152 to expose a tongue (not shown) without having to remove the grip 151 from the shaft 152.

The dumping cart 100 of the disclosure allows the article retaining bed 110 to be placed in an over-dump orientation as illustrated in FIGS. 13-18. In this orientation, rear wheels 140 rotate further and off the ground while the front wheels 130 stay on the ground. When in the over-dump orientation, the rear wheel rotation axis 141 remains intermediate the front wheel rotation axis 131 and the articulation axis 121, but the articulation axis 121 is intermediate the rear wheel rotation axis 141 and the ground. This over-dump orientation allows the floor 111 of the article retaining bed 110 to easily flip over from a vertical position to remove hard-to-dump materials being transported by the dumping cart 100 while still being able to pull the dumping cart 100 away on the front wheels 130.

The dumping cart 100 of the present invention also allows the article retaining bed 110 to be placed in a full-dump orientation as illustrated in FIGS. 19-24. In this orientation, the rear wheels 140 rotate even further while the front wheels stay on the ground. When in the full-dump orientation, the rear wheel rotation axis 141 remains intermediate the front wheel rotation axis 131 and the articulation axis, but the rotation allows the articulation axis 121 to be intermediate the rear wheel rotation axis 141 and the floor 111 of the article retaining bed 110. This full-dump orientation allows the floor 111 of the article retaining bed 110 to be substantially parallel with the ground. In the preferred embodiment, the front wall 112, rear wall 113, and right and left side walls 114, 115 are configured to have the same height, which allows the upper end of all the walls (112-115) to be in contact with the ground while the front wheels 130 are also in contact with the ground. This full-dump orientation allows a user to bang the floor 111 of the article retaining bed 110 to dislodge any hard-to-remove articles or material being dumped from dumping cart 100.

The preferred embodiment of the present invention has been set forth in FIGS. 1-24 and the specification. Although specific terms have been utilized, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

A further disclosure of the present invention includes an improved means of attaching an article retaining bed 110 to a cart 100. Dumping cart 100 article retaining beds 110 are commonly constructed of molded composite plastic because it provides strong, light-weight structure with a smooth friction-reducing surface that is not susceptible to rust when using in outdoor environments. Article retaining beds 110 are typically attached to a chassis, axle, or frame via bolts. To prevent interference with removal of materials while using an implement (e.g., shovel, hoe, etc.), carriage bolts are commonly used because they have a relatively low profile. However, even with the low profile and curved head, carriage bolts still allow implements to catch when removing articles or material from an article retaining bed. Further, Carriage bolts have a tendency to spin while their respective nuts are tightened.

Referring to FIGS. 30-34, a square-head bolt 200 for attaching an article retaining bed 110 to a cart 100 is disclosed. The square-head bolt 200 has a head 210 and shank 230. The head 210 of the square-head bolt 200 further comprises head surface 215, a head width 216, a head length 217, a head depth 218, and a head bearing surface 220. The shank 230 has a length 231 and 232. The shank 230 may be threaded with any standard configuration for use with standard nuts (not shown). The preferred embodiment utilizes nylon insert lock nuts (Nylock).

FIGS. 25-29 disclose another aspect of the improved means of attaching an article retaining bed 110 to a cart 100. FIG. 25 shows a detailed top (inside) view of the floor 111 of an article retaining bed 110. Illustrated are two bolt receivers 170 of the present invention. Each bolt receiver 170 has a receiver head width 176, a receiver head length 177, and a receiver head depth 178. Each receiver also comprises a receiver shaft 172 having a receiver shaft diameter 173, a receiver shaft depth 174, a receiver bearing surface 171, and at least one nub 175.

The preferred embodiment of the square-head bolt 200 and bolt receiver 170 is for the bolt head width 216 and bolt head length 217 to be equal (i.e., square bolt head 210) and the receiver head width 176 and receiver head length 177 to be equal (i.e., square. receiver head). This arrangement allows for the square-head bolt 200 to fit into the bolt receiver 170 regardless of orientation, which facilitates attaching article retaining beds 110 to carts 100. However, it is contemplated that the square-head bolt 200 and bolt receiver 170 can have rectangular shape to provide additional strength in a specific orientation.

The bolt receiver 170 is sized to securely accommodate the square head bolt 200. Thus, the bolt receiver head width 176, length 177, and depth 178 are all just large enough to accommodate the square head bolt head width 216, length 217, and depth 218. Further, the bolt receiver shaft diameter 173 is also just large enough to accommodate the square-head bolt shank diameter 231. The square-head bolt shank length 232 is sufficiently longer than the receiver shaft depth 174 to allow a nut (not shown) to be threaded and locked onto the square-head bolt 200. This arrangement allows the surface of the article retaining bed to be smooth and prevent material or tools from catching on the means of attaching the article retaining bed 110 to the cart 100.

To facilitate attachment of the article retaining bed 110 to the cart 100, the disclosure also includes one or more nubs 175 along the receiver shaft length 174. The nubs 175 are sized to provide friction to prevent a square-head bolt 200 from sliding out of the receiver shaft 172 when the article retaining bed 100 is turned upside down for access to the nuts (not shown), such as when the cart 100 is being assembled. Preferably, there are three nubs 175 located at the bottom end of the receiver shaft 172.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations, and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A system for attaching an article retaining bed to a chassis comprising:
   an article retaining bed comprising a bolt receiver, the bolt receiver comprising:
      a receiver head comprising:
         a receiver head width;
         a receiver head length;
         a receiver head depth; and
         a receiver bearing surface;
         wherein the receiver head width is substantially equal to the receiver head length; and
      a receiver shaft comprising a receiver shaft diameter and a receiver shaft depth;
   a chassis;
   a bolt comprising:
      a bolt head comprising:
         a head surface;
         a head width, the bolt head width being less than the receiver head width;
         a head length, the bolt head length being less than the receiver head length;
         a head depth, the bolt head depth being less than the receiver head depth; and
         a head bearing surface;
         wherein the bolt head width is substantially equal to the bolt head length; and
      a bolt shank comprising:
         a bolt shank diameter; and a bolt shank depth; and
   a nut configured to screw onto the bolt shank.

2. The system for attaching an article retaining bed to a chassis of claim 1 wherein the head bearing surface rests against the receiver bearing surface.

3. The system for attaching an article retaining bed to a chassis of claim 2 wherein the bolt head cannot rotate.

4. The system for attaching an article retaining bed to a chassis of claim 3 wherein the receiver shaft comprises at least one nub.

5. The system for attaching an article retaining bed to a chassis of claim 4 wherein the nub is formed as part of the retaining bed.

6. The system for attaching an article retaining bed to a chassis of claim 5 wherein the nub prevents the bolt from dislodging from the bolt receiver by gravity.

7. The system for attaching an article retaining bed to a chassis of claim 6 wherein the nub is located adjacent to the receiver bearing surface.

8. The system for attaching an article retaining bed to a chassis of claim 6 wherein the nub is located distal to the receiver bearing surface.

9. The system for attaching an article retaining bed to a chassis of claim 8 wherein the receiver shaft comprises two nubs.

10. The system for attaching an article retaining bed to a chassis of claim 8 wherein the receiver shaft comprises three nubs.

11. The system for attaching an article retaining bed to a chassis of claim 1 wherein the nut is a nylon insert lock nut.

12. A method for attaching an article retaining bed to a chassis:
   inserting a bolt through an article retaining bed bolt receiver and the chassis, the bolt receiver comprising:
      a receiver head comprising:
         a receiver head width;
         a receiver head length;
         a receiver head depth; and
         a receiver bearing surface;
         wherein the receiver head width is substantially equal to the receiver head length;
      a receiver shaft comprising a receiver shaft diameter and a receiver shaft depth;
      and at least one nub;
      the bolt comprising:
         a bolt head comprising:
            a head surface;
            a head width, the bolt head width being less than the receiver head width;
            a head length, the bolt head length being less than the receiver head length;
            a head depth, the bolt head depth being less than the receiver head depth; and
            a head bearing surface;
            wherein the bolt head width is substantially equal to the bolt head length; and
         a bolt shank comprising:
            a bolt shank diameter; and
            a bolt shank depth;
            wherein the head bearing surface rests against the receiver bearing surface;
         wherein the bolt head cannot rotate more than 90 degrees;
         wherein the nub prevents the bolt from dislodging from the bolt receiver by at least a force of gravity; and
   securing the chassis to the article retaining bed by screwing a nut to the bolt shank.

13. The method of attaching an article retaining bed to a chassis of claim 12 wherein the nut is a nylon insert lock nut.

14. The method of attaching an article retaining bed to a chassis of claim 12 wherein the bolt receiver comprises two nubs.

15. The method of attaching an article retaining bed to a chassis of claim 12 wherein the bolt receiver comprises three nubs.

16. The method of attaching an article retaining bed to a chassis of claim 15 wherein at least one of the nubs is formed as part of the retaining bed.

17. The method of attaching an article retaining bed to a chassis of claim 12 wherein the nub prevents the bolt from dislodging from the bolt receiver by gravity.

18. The method of attaching an article retaining bed to a chassis of claim 17 wherein the nub is located distal to the receiver bearing surface.

19. The method of attaching an article retaining bed to a chassis of claim 17 wherein the nub is located adjacent to the receiver bearing surface.

20. The method of attaching an article retaining bed to a chassis of claim 17 comprising a nub located distal to the receiver bearing surface and a nub located adjacent to the receiver bearing surface.

* * * * *